United States Patent
Felber et al.

(10) Patent No.: US 9,250,157 B2
(45) Date of Patent: Feb. 2, 2016

(54) METHOD AND DEVICE FOR RECOGNIZING ROTATIONAL SPEED / TORQUE FLUCTUATIONS IN A DRIVE DEVICE

(71) Applicant: Audi AG, Ingolstadt (DE)

(72) Inventors: Mathias Felber, Ingolstadt (DE); Jürgen Pfeiffer, Ingolstadt (DE)

(73) Assignees: AUDI AG, Ingolstadt (DE); AVL DEUTSCHLAND GMBH, Mainz-Kastel (DE)

( * ) Notice: Subject to any disclaimer, the term of this patent is extended or adjusted under 35 U.S.C. 154(b) by 0 days.

(21) Appl. No.: 14/351,454

(22) PCT Filed: Oct. 9, 2012

(86) PCT No.: PCT/EP2012/004224
§ 371 (c)(1),
(2) Date: Apr. 11, 2014

(87) PCT Pub. No.: WO2013/053461
PCT Pub. Date: Apr. 18, 2013

(65) Prior Publication Data
US 2014/0309851 A1    Oct. 16, 2014

(30) Foreign Application Priority Data
Oct. 13, 2011    (DE) .................. 10 2011 115 927

(51) Int. Cl.
*G01M 17/007*    (2006.01)
*F02D 41/14*    (2006.01)
(Continued)

(52) U.S. Cl.
CPC ......... *G01M 17/007* (2013.01); *F02D 41/1498* (2013.01); *F02N 11/106* (2013.01); *F02D 41/0097* (2013.01); *F02D 2041/286* (2013.01)

(58) Field of Classification Search
CPC ....... B60L 3/00; B60L 3/0023; B60L 3/0038; B60L 3/0084; G01M 17/00; G01M 17/04; G01M 17/007; F02D 41/0097; F02D 41/1498; F02D 2041/286; F02N 11/106
USPC ..................... 73/650; 701/33.7, 33.9, 79, 124
See application file for complete search history.

(56) References Cited

U.S. PATENT DOCUMENTS 3,929,008 A * 12/1975 Zlotin et al. .................... 73/660
5,747,678 A    5/1998 Angermaier
(Continued)

FOREIGN PATENT DOCUMENTS

DE    602004004608    11/2007
DE    102004041205    2/2009
(Continued)

OTHER PUBLICATIONS

International Search Report issued by the European Patent Office in International Application PCT/EP2012/004224 on Feb. 21, 2013.

*Primary Examiner* — Jerrah Edwards
*Assistant Examiner* — Tamara Weber
(74) *Attorney, Agent, or Firm* — Henry M. Feiereisen LLC (57) ABSTRACT

A method for detecting rotational speed/torque fluctuations, in particular patterns of such fluctuations, of a drive device, in particular in a motor vehicle, includes the following steps: detecting a critical rotational speed situation by comparing a measured actual rotational speed with specified characteristic rotational speeds; detecting a local rotational speed minimum and a local rotational speed maximum (local rotational speed variables); analyzing the local rotational speed variables by generating local rotational speed characteristic values, such as a local amplitude and a local frequency preferably; directly or indirectly determining the duration of a local vibration time period, wherein substantially constant local rotational speed characteristic values are present within the time period; and describing a local vibration pattern, the pattern exhibiting at least the local amplitude, local frequency, or the local vibration time period.

15 Claims, 3 Drawing Sheets

(51) Int. Cl.
*F02N 11/10* (2006.01)
*F02D 41/00* (2006.01)
*F02D 41/28* (2006.01)

(56) References Cited

U.S. PATENT DOCUMENTS

| | | | |
|---|---|---|---|
| 6,253,620 B1* | 7/2001 | Yamashita | 73/650 |
| 7,934,485 B2* | 5/2011 | Ota et al. | 123/350 |
| 8,161,740 B2* | 4/2012 | Krause et al. | 60/338 |
| 8,352,140 B2* | 1/2013 | Herter et al. | 701/67 |
| 8,798,880 B2* | 8/2014 | Cousins et al. | 701/54 |
| 2004/0079173 A1* | 4/2004 | Neely et al. | 73/862.333 |
| 2005/0216145 A1* | 9/2005 | Bellinger et al. | 701/29 |
| 2007/0225886 A1* | 9/2007 | Morris | 701/51 |
| 2009/0223771 A1* | 9/2009 | Masaki et al. | 192/70.17 |
| 2010/0273607 A1* | 10/2010 | Winkler et al. | 477/115 |
| 2012/0037120 A1 | 2/2012 | Dietl | |
| 2013/0325289 A1* | 12/2013 | Ikeda et al. | 701/101 |

FOREIGN PATENT DOCUMENTS

| | | | |
|---|---|---|---|
| DE | 102008050287 | | 4/2009 |
| DE | 102008051102 | | 4/2009 |
| DE | 102009013142 | | 9/2010 |
| EP | 0 595 505 | | 5/1994 |
| EP | 0 711 989 | | 5/1996 |
| EP | 2 149 694 | | 2/2010 |
| EP | 2 230 393 | | 9/2010 |
| JP | 2005247234 | * | 9/2005 |
| JP | 2010-127105 | | 6/2010 |
| WO | WO 2010/121888 | | 10/2010 |

* cited by examiner

METHOD AND DEVICE FOR RECOGNIZING ROTATIONAL SPEED / TORQUE FLUCTUATIONS IN A DRIVE DEVICE

CROSS-REFERENCE TO RELATED APPLICATIONS

This application is the U.S. National Stage of International Application No. PCT/EP2012/004224, filed Oct. 9, 2012, which designated the United States and has been published as International Publication No. WO 2013/053461 A1 and which claims the priority of German Patent Application, Serial No. 10 2011 115 927.8, filed Oct. 13, 2011, pursuant to 35 U.S.C. 119(a)-(d).

BACKGROUND OF THE INVENTION

The present invention relates to a method and a device for recognizing rotational speed fluctuations/rotational torque fluctuations in a drive device, in particular in a motor vehicle wherein this drive device has at least one combustion engine and at least one torsional vibration influencing device, in particular a dual mass flywheel. In the following the method according to the invention is explained by way of a motor vehicle with combustion engine, it is noted that such a method can also be used in hybrid vehicles and vehicles with range extender.

Usually combustion engines are used in motor vehicles which work according to a discontinuous combustion principle, in particular, these are two stroke or four stroke combustion engines, which depending on the utilized fuel are mostly referred to as Otto or Diesel engines. Based on their working principle, these combustion engines have in common that a generated rotational torque is discontinuous and is subject to certain fluctuations. Such fluctuations occur independent of the kinematic of the combustion engine, in particular independent of whether the combustion engine is constructed as a rotary piston engine or as reciprocating engine. These rotational torque fluctuations oftentimes result in undesired rotational torque fluctuations in a drivetrain of a motor vehicle. Such rotational torque fluctuations usually cause additional stress for the drive train and are mostly perceived as bothersome by vehicle occupants, therefore many motor vehicles have devices for influencing in particular for reducing these fluctuations. Devices that have proven to be particularly effective for reducing interfering torque/ rotational speed fluctuations are so called dual mass flywheels. In particular dual mass flywheels but also other devices of a drive device often have an natural vibration behavior (natural frequencies). When these devices are excited in the range of the natural frequency with vibrations this can lead to an unfavorable operating behavior, this results in the fact that these devices have operating ranges to be favored, operating ranges to be less favored and operating ranges to be avoided. Operating ranges to be avoided are in particular those within which the corresponding device is excited to vibrate with its natural frequency (resonance). In this regard it is usually very important for the operating range of these devices with which rotational speed/torque fluctuation or respectively with which sequence of rotational speed/ torque fluctuations these devices are impinged. In order to be able to take the rotational speed/torque fluctuations into account when controlling the drive device it is important to first sufficiently detect the same.

From the state of the art methods are known by means of which rotational speed/torque fluctuations can be detected. From WO2010/121888 it is known to determine a local maximal value of the rotational speed, to determine the differential value between this maximal value and the actual rotational speed and to turn off the combustion engine in dependence on this differential value.

SUMMARY OF THE INVENTION

The object of the present invention is to present an improved method for recognizing rotational speed/torque fluctuations in the drive train and a device for carrying out such a method. For solving this object a method according to claim 1, and for performing the method a device according to claim 11 is proposed, preferred refinements are the subject matter of the dependent claims.

A method according to the invention for recognizing rotational speed/torque fluctuations, in particular of patterns of such fluctuations of a drive device, in particular in a motor vehicle, wherein this drive device has at least one combustion engine and a torsional vibration influencing device, has at least the steps of:

recognizing rotational speed/torque fluctuations, for this the rotational speed of this torsional vibration influencing device is determined in particular the temporal course of the latter, detecting a local rotational speed minimum and a local rotational speed maximum, wherein at least these values are to be understood as local rotational speed values, analyzing these local rotational speed values, in particular forming local rotational speed characteristic values, such as preferably a local amplitude and a local frequency, direct or indirect determination of the duration of a local vibration time period wherein essentially constant local rotational speed values are present within this time period and in this way the description of a local vibration pattern the latter having at least the local amplitude, local frequency and the local vibration time period is made possible.

A device according to the invention for performing this method has preferably a calculator, in particular a central processing unit (CPU), a memory device, in particular for storing data and preferably one or multiple measuring value detection devices, in particular for detecting temperatures, rotational speeds, times, frequencies or other parameters. Preferably a device for carrying out the method according to the invention is to be understood as an electronic circuit and measuring devices. Further preferably as an electronic control device and measuring sensors connected therewith. Further preferably the method according to the invention is carried out in one or multiple electronic control devices of the motor vehicle, preferably in at least one motor control device, further the data relevant for this method are obtained with sensors.

The calculator is preferably configured to analyze rotational speed values, such as for example the rotational speed, the frequency, the amplitude, the temporal course of the rotational speed, in particular of the torsional vibration influencing device. Preferably the local rotational speed characteristic values are formed by means of this calculator.

The memory device is preferably configured to store at least these local rotational speed values or at lest these local or at least these global vibration patterns.

The measuring value detection device is preferably configured to detect the rotational speed of the torsional vibration influencing device, further preferably these further measuring detection devices are provided to detect further measuring values, such as preferably temperatures, degree of humidity, mass- or volume proportion or the like.

A drive device within the meaning of the invention is to be understood as a device for providing and transmitting drive power, usually in the form of rotational torque and rotational speed. Preferably such a drive device is used in a motor vehicle in order to generate power in a drive machine and to transfer the power to a wheel-tire combination for driving the vehicle. Further preferably a drive device has a combustion engine, a torsional vibration influencing device and further devices for transferring drive power from this combustion engine to one or multiple wheel-tire combinations. Preferably such further devices are transmission devices, articulated shaft, shafts or the like.

A combustion engine within the meaning of the invention is a device in which energy, preferably in chemically bound form, is converted into mechanical power. Preferably a combustion engine operates according to a discontinuous combustion principle in contrast to a continuous combustion principle such as in gas turbine devices. Further preferably a combustion engine is configured as a two stroke combustion engine preferably as a four stroke combustion engine.

Preferably this combustion engine has at least two modes of operation. Preferably a first mode of operation is a drive mode of operation. Such a drive mode of operation is in particular characterized in that a drive power is transferred from the combustion engine to a torsional vibration influencing device. Preferably a second mode of operation is an idle mode of operation. Such an idle mode of operation is particularly characterized in that no drive power is transferred from the combustion engine to a torsional vibration influencing device. Further preferably this drive power is in particular transmitted by a driven shaft of the combustion engine. Further preferably, such a drive power is in particular transmitted in the form of a rotational speed and a rotational torque.

A torsional vibration influencing device within the meaning of the invention is a device which is provided to influence rotational speed/rotational torque fluctuations which occur in a drive train, in particular such fluctuations which are generated by one these combustion engines, to particularly reduce these fluctuations. Preferably the frequency of such a vibration is changed by this torsional vibration influencing device. Further preferably in particular the amplitude of such a vibration is reduced by a vibration which is generated by means of this torsional vibration influencing device and is preferably anti phasic or is preferably completely eliminated. Preferably, damping means the reducing of a vibration amplitude of this vibration, in particular by energy conversion processes. Preferably the damping of this vibration is achieved by generating friction work, preferably solid state friction or preferably viscose friction. Preferably a torsional vibration influencing device is to be understood as a device which has an input element (first mass) an output element (second mass) and a preferably elastic connection device. Further preferably this elastic connection device enables in particular a rotational movability between this input element and this output element. Further preferably this connection device has a spring element and a damping element. Preferably a torsional vibration influencing device is configured as a so called dual mass flywheel, particularly preferably as dampened dual mass flywheel. Preferably this input element is coupled with the driven shaft of the combustion engine and this output element can be coupled with a transmission device or the like.

The recognition of a critical rotational speed situation within the meaning of the invention is the measuring of the rotational speed of the driven shaft and comparison of the rotational speed with a rotational speed threshold value. Preferably the measuring occurs repeatedly and with a defined sampling frequency. Preferably a result of this recognition is the temporal course of the rotational speed of the combustion engine, in particular the course of the rotational speed of the driven shaft. Preferably a mathematical function is formed from the determined discrete rotational speed values, which approximates or describes the temporal course of the rotational speed at least in regions. Preferably the critical rotational speed situation occurs below a rotational speed threshold value. When a critical rotational speed situation occurs, the driving comfort may be adversely affected or respectively the torsional vibration influencing device may suffer damage, wherein this damage does not necessarily coincide with the occurrence of the critical rotational speed situation. Preferably the determined measuring values with regard to the rotational speed/torque fluctuations can be transformed from a time domain into a display domain, preferably by a Fast-Fourier-Transform (FFT), further preferably into the frequency domain. Such a transformation facilitates analysis of these measurement values.

The detection of a local rotational speed minimum means the assessment of the measured rotational speed of this driven shaft. Preferably a local rotational speed minimum is recognized when it is determined that immediately prior to and after this rotational speed minimum the rotational speed of this driven shaft is higher than at this local rotational speed minimum. Preferably when a mathematical description of the course of the rotational speed is available, this local rotational speed minimum can be found by forming and analyzing the $1^{st}$ derivative of this mathematical description of this course of the rotational speed.

The detection of a local rotational speed maximum relates to the assessment of the measured rotational speed of this driven shaft. Preferably a local rotational maximum is recognized when it is determined that immediately prior to or after this rotational speed maximum the rotational speed of this driven shaft is smaller than at this local rotational speed maximum. Preferably when a mathematical description of the course of the rotational speed is available, this local rotational speed maximum can be found by forming and analyzing the $1^{st}$ derivative of this mathematical description of this course of the rotational speed.

Within the meaning of the invention local rotational speed values relate at least to the local rotational speed minima and maxima.

Within the meaning of the invention analyzing these local rotational speed values relates to determining from this local rational speed minimum and this local rotational speed maximum a local amplitude, in particular by differential formation. Preferably a local frequency is derived from a succession of at least one rotational speed minimum and one rotational speed maximum. Further preferably this local amplitude and frequency are present during a local vibration time period.

Within the meaning of the invention direct or indirect determination of the duration of a local vibration time period relates to determining the duration within which a vibration is present with essentially the same local frequency and amplitude. Preferably the amplitude and local frequency of a vibration are regarded as essentially the same so long as they do not depart from a predeterminable local vibration tolerance range. Further preferably a vibration tolerance range relates to a range, which is preferably delimited by two tolerance threshold values. Preferably these threshold values can be independently predetermined for the amplitude and the frequency, further preferably they are also predeterminable independently for the maximal value and the minimal value. Preferably this tolerance range is correlated with a tolerance basis, wherein the latter is correlated with at least one of the local rotational speed values, which are affected by this tolerance range. Preferably the tolerance basis is correlated with the first determined local amplitude/frequency of a local vibration pattern, preferably with multiple of these measured local rotational speed values, particularly preferably with a mean value from the local rotational speed values that have been determined up to this time point. Preferably one of these vibrations is regarded to be the same when the local rotational speed value does not exceed any of these threshold values and one of these threshold values relative to the tolerance basis is preferably greater by 25% and particularly preferably 3% than the tolerance basis and a further one of these threshold values is preferably smaller by 25% and particularly preferably 3% than the tolerance basis.

Within the meaning of the invention the direct determination of the duration of this vibration time period means that the duration of this vibration time period is determined by means of measuring time.

Within the meaning of the invention the indirect determination of the duration of this vibration time period means that at least the number of he occurring torsional vibrations is detected preferably for this the number of the occurring local rotational speed minima or the local rotational speed maxima, preferably the occurring local rotational speed minima and maxima.

Within the meaning of the invention the describing of a local vibration pattern means that at least the duration of the vibration time period, at least the frequency present within this time period or at least the amplitude present in this time period is stored or is provided for further use. Preferably the stored data are selected so that they can be used to describe the occurred vibration.

Within the meaning of the invention a rotational speed threshold value means a predeterminable or changeable rotational speed value, preferably for the driven shaft or the torsional vibration influencing device. Preferably this rotational speed threshold value is selected so that below this rotational speed threshold value critical rotational speed situations can occur. Preferably the rotational speed threshold value is selected that above this value essentially no damage to the torsional vibration influencing device are to be expected.

By means of a method according to the invention thus preferably a data basis for the comparison of occurred vibration patterns with predefined reference vibration patterns can be generated.

Within the meaning of the invention measuring value detection devices that are connected with the control device means devices for detecting measuring values, which are provided to transmit these data to at least one control device. Preferably a measuring value detection device converts measuring values into electric measuring signals. Preferably the measuring value detection devices are connected with the control device by means of signal lines, preferably conductor lines, cables, optical conductors or the like. Further preferably the measuring value detection devices are wirelessly connected with the control device via radio waves or optical waves. In particular by way of a conductor-bound connection of the measuring sensors with the control devices a particularly reliable data transmission can be achieved. By a wireless connection with the control device, measuring sensors can be arranged at sites of the motor vehicle which are in particular difficult to access and pose rough operating conditions, in particular in a combustion engine.

In the following, preferred refinements of the invention are described.

In a preferred embodiment the measured actual rotational speed is compared with a predeterminable rotational speed threshold value. This rotational speed threshold value is preferably dependent on the local frequency or on the local amplitude of the measured rotational speed fluctuation. In a particularly preferred embodiment at least one of the devices of this drive device, in particular the torsional vibration influencing device, has a torsional vibration behavior that is changeable with the rotational speed, in particular natural frequencies that are changeable with the rotational speed. This rotational speed threshold value is preferably selected so that below this threshold value no critical rotational speed situations are to be expected. Preferably such a critical rotational speed situation is not to be expected when this drive device or at least a device of this drive device is essentially not excited to vibrate with one of its natural frequencies. In particular by way of a rotational speed threshold value which is dependent on the frequency or the amplitude or both, a particularly accurate recognition of the relevant vibration patterns is enabled and with this an improved method for recognizing the same.

Such a falling below of this rotational speed threshold value can in particular occur for operating situations in which the rotational speed of the combustion engine is caused to drop below the idle rotational speed of the combustion engine as a result of a corresponding operating or driving behavior, in particular of the driver. Such situations can occur when the vehicle is choked by corresponding braking while the gear is engaged, or when standing by corresponding actuation of the clutch. Such situations can also occur during start up of the combustion engine when an ignition key is only actuated for a short time. Such a falling below the rotational speed threshold value can also occur when in vehicles with manual shift a too high gear is inadvertently selected during the drive.

In a preferred embodiment a further one of these local vibration patterns is determined when one of these local rotational speed characteristic values, preferably at least the local frequency or local amplitude, above a vibration tolerance value. Preferably a particularly accurate detection of multiple local vibrations is achieved by the detection of multiple local vibration patterns. In particular by means of the sequence and description of multiple local vibration patterns an exact detection of the present rotational speed /torque fluctuations can be achieved and with this an improved method be provided.

In a preferred embodiment a local vibration pattern has at least the following data:
local amplitude,
local frequency,
local vibration time period,
local equivalent rotational speed.

Preferably the local equivalent rotational speed means a characteristic value in particular of the rotational speed of the torsional vibration influencing device, which characterizes the rotational speed in particular of this device within the vibration time period. Preferably this local equivalent rotational speed means the mean value of the rotational speed of the torsional vibration influencing device within this vibration time period. Preferably such a rotational speed mean value is an arithmetic mean value, a geometric mean value, a harmonic mean value, a quadratic mean value or the like. In particular, recording the mentioned values for describing a local vibration pattern enables a sufficiently accurate description of this pattern and with this an improved method is provided.

In a preferred embodiment this local vibration pattern has beside the aforementioned data in addition or as an alternative also the number of the vibrations which have occurred within the local vibration time period. In particular the number of the vibrations that have occurred within the vibration time period is important for describing a local rotational speed vibration, the detection of tis number enables an improved method.

In a preferred embodiment a global vibration pattern is formed from at least one, preferably from multiple of these local vibration patterns when a vibration time period threshold value or a predetermined number of vibrations is exceeded.

Preferably this global vibration pattern is formed by a combination of multiple local vibration patterns. In particular by combining multiple vibration patterns which in particular have different local rotational speed characteristic values, into a global vibration pattern a particularly accurate description of the occurred rotational speed/torque fluctuations is enabled and with this an improved method is provided.

In a preferred embodiment this global vibration pattern or at least one local vibration pattern is compared with predetermined reference vibration patterns. Further this comparison enables a categorization of this vibration pattern. Preferably this categorization occurs at least by way of two different categories, wherein in the case of association to a first category control commands for changing the rotational speed of at least this torsional vibration influencing device are proposed and in the case of association to a second category no such control commands are proposed.

Preferably for this categorization at least one of the category is based on a model formation for this drive device. Preferably such a model formation has a torsional vibration analysis of this drive device, preferably this torsional vibration analysis has the determination of at least one natural frequency of at least one device of this drive device, preferably the torsional vibration influencing device. Further preferably such a model formation is based on the calculation of rotational masses and rotational stiffnesses, preferably by means of analytical calculation models or particularly preferably by means of a calculation model on the basis of finite elements. Further preferably such a model formation is based on experimental tests of this drive device, preferably tests regarding the natural frequency behavior of this drive device or individual devices, in particular the torsional vibration influencing device. In particular by the association of the detected vibration patterns to predetermined reference vibration patterns which preferably are adjusted to the drive device a simple possibility for assessing the occurred rotational/ torque fluctuations is made possible and with this an improved method is provided.

In a preferred embodiment this categorization, in particular the selection of the reference vibration patterns, depends on at least one, preferably on multiple, preferably on all local equivalence rotational speeds. Further preferably the selection of these reference vibration patterns is dependent on at least one of the actual rotational speeds in this vibration time period. In particular by selecting the reference vibration patterns in dependence on rotational speed an improved assessment of the occurring rotational speed/ torque fluctuations and with this in particular an improved control of the drive device is enabled and with this an improved method is provided.

In a preferred embodiment a control command is generated in dependence on the association of this vibration pattern to one of these reference vibration patterns. Preferably this control command leads to a change of the rotational speed of this torsional vibration influencing device. Further preferably this change of rotational speed of this torsional vibration influencing device is achieved by means of a change of the rotational speed of the combustion engine. Preferably this change of rotational speed is in particular achieved by an increase of the rotational speed of the combustion engine preferably by a decrease of the rotational speed of the combustion engine. In particular by generating a control command for this drive device not only a vibration pattern is detected but also a direct reaction to the recognized vibration pattern is generated and with this an improved method is provided.

BRIEF DESCRIPTION OF THE DRAWINGS

Further advantages, features and applications of the present invention result from the following description in connection with the Figures.

It is shown in.

DETAILED DESCRIPTION OF PREFERRED EMBODIMENTS

Figure 1:
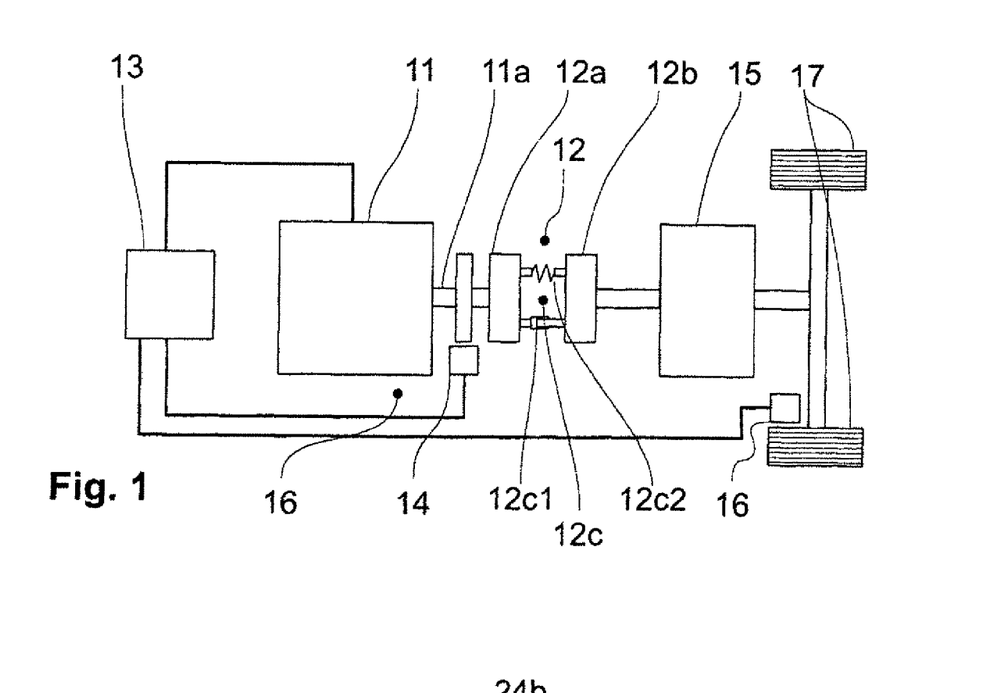
FIG. 1 an exemplary drive train of a motor vehicle.

FIG. 1 shows an exemplary drive train of a motor vehicle. The combustion engine 11 transmits an output torque and a drive rotational speed to a dual mass flywheel 12 via its driven shaft 11a. This dual mass flywheel 12 has an input side 12a and an output side 12b, wherein these two sides (12a, 12b) each represent a rotational mass. This input side 12a and this output side 12b are supported for movement relative to each other within a predetermined angular range. Further this input side 12a and this output side 12b are coupled with each other by means of a connecting device 12c. This connection device 12c has a damper element 12c1 and a spring element 12c2. Rotational speed vibrations of this driven shaft 11a are on one hand damped by the damping device 12c1 and on the other hand a counter vibration is generated by a vibrating two mass system and thus the amplitude of rotational speed vibrations reduced. This vibrational dual mass system is formed by the input side 12a and the output side 12b, wherein these are in particular connected by means of the spring element 12c2. From the output side of the dual mass flywheel 12b, the torque and the rotational speed are transferred to a transmission device 15. The control of this combustion engine 11 occurs by means of the electronic control device 13, the method according to the invention being capable of being performed by this electronic control device. This electronic control device 13 records rotational speed information by means of a rotational speed sensor 14. Further the driving speed of the motor vehicle is detected by means of the speed detection device 16 and this information is provided to the electronic control device 13. The speed measuring device 15 detects the rotational speed of the wheel-tire combination 17 directly or indirectly, from this the information of the driving speed of the motor vehicle can be derived.

Figure 2:
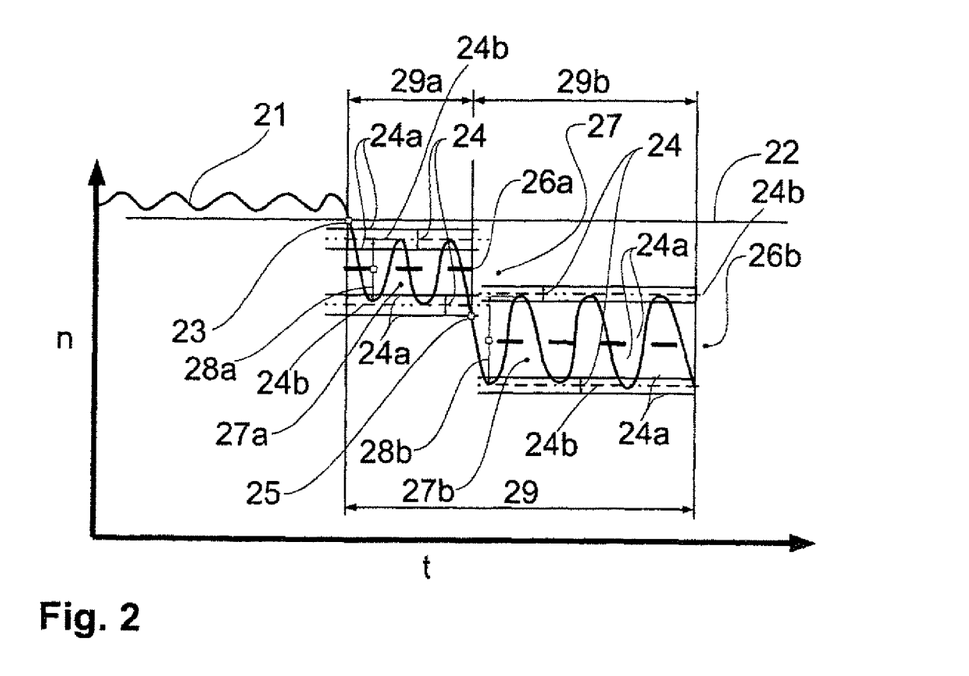
FIG. 2 the exemplary course of the rotational speed n of the driven shaft/torsional vibration influencing device plotted over the time t, FIG. 3 different exemplary vibration patterns, FIG. 4 an example of a determined course of a rotational speed n of the driven shaft plotted over the time t.

FIG. 2 shows the exemplary course of the rotational speed n of the driven shaft 11 a (not shown) over the time t. this temporal course 21 is compared with a rotational speed threshold value 22. When the rotational speed n falls below this rotational speed threshold value 22 a critical rotational speed situation is recognized from this time point 23 on and the method according to the invention starts by analyzing the further temporal course of the rotational speed n. Such a decrease of the rotational speed n below the rotational speed threshold value 22 can result from an incorrect selection of a gear of the transmission device (not shown) or by problems as they can result during the start of the combustion engine, in particular by turning off and restarting the combustion engine in short succession, or by actuation of a starting device for a too short time. So long as the local rotational speed values are within predetermined tolerance values 24, here within tolerance values for the rotational speed (amplitude). When the actual rotational speed here at the time point 25 exceeds one of these tolerance values 24 the recognition of a further local vibration pattern is initiated. Within a local vibration time period 29a, 29b an essentially constant local amplitude and frequency is present. When the fluctuations of this rotational speed are present over a predetermined time period, the so called vibration time period 29, a global vibration pattern 27 is established from the data from the local vibration patterns 27a, 27b. A local vibration pattern is characterized by its local frequency (not shown) by its amplitude 28a, 28b and by a local rotational speed characteristic value 26a, 26b.

Figure 3:
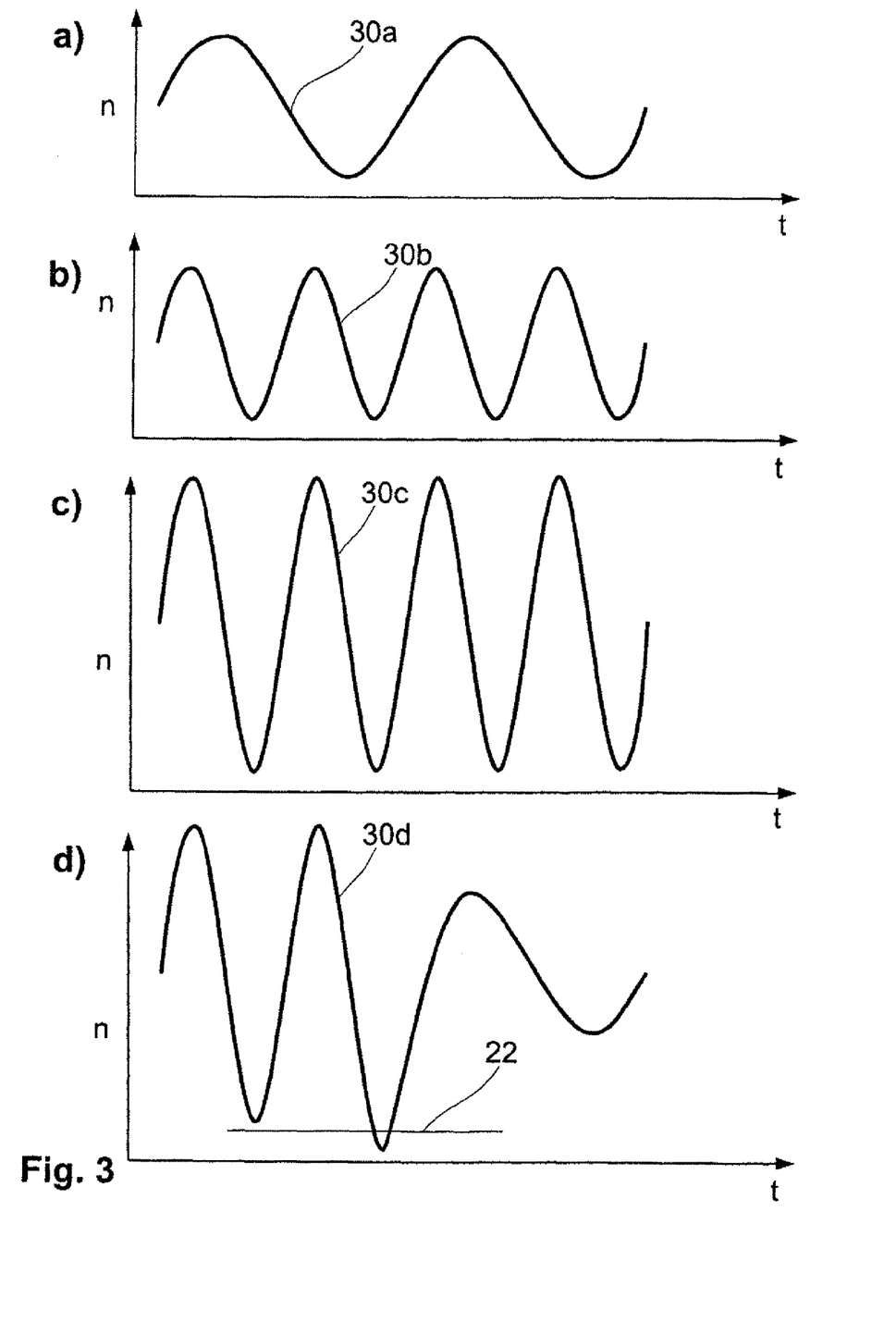

FIG. 3 shows different exemplary vibration patterns, shown in the time domain. FIGS. 3a and 3d respectively show the rotational speed vibrations 30a to 30b, amplitude of the rotational speed n, over a time t. FIG. 3a shows a pattern of a rotational speed fluctuation 30a with low frequency and low amplitude. Such low frequency fluctuations can in particular occur in the range of low drive rotational speeds as far as they lie in the range of a natural frequency, lead to the damage of the same.

FIG. 3b shows a pattern of a rotational speed fluctuation 30b with a frequency, which is greater relative to FIG. 3a and same amplitude. Such higher frequency fluctuations can occur in particular in the range of drive rotational speeds which are higher compared to FIG. 3a and as far as they lie in the range of a natural frequency, in particular of the dual mass flywheel lead to damage to the same. Dual mass flywheels often have a natural frequency behavior, which depends on their rotational speed.

FIG. 3c shows a pattern of a rotational speed fluctuation 30c with an amplitude, which is greater compared to FIG. 3. Such increased fluctuations are usually to be assessed as more critical than fluctuations with smaller amplitude at otherwise same operating conditions.

FIG. 3d shows a pattern of a rotational speed fluctuation 30d which has from a high frequency part with great amplitude and a low frequency part with small amplitude. Certain successions can depending on the particularities of the respective drive device lead to critical excitations of this drive device. It can further be recognized from FIG. 3d that the shown pattern 30d falls below the rotational speed threshold value 22. Also such singularly occurring events can influence the categorizing of one of these patterns of the rotational speed fluctuations.

Figure 4:
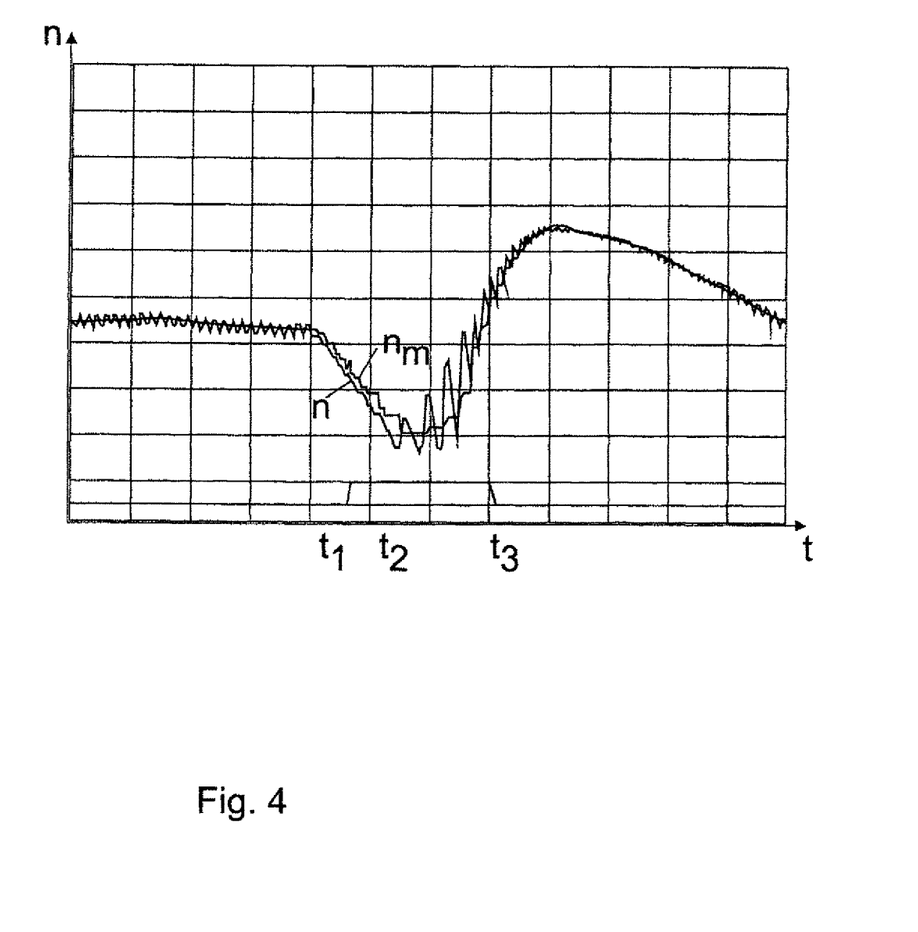

FIG. 4 shows an example for a determined course of the rotational speed n of the combustion engine 11 over the time t. As can be seen from the temporal course, the rotational speed n is essentially constant up to the time point $t_1$ and only shows little fluctuations in the form of smaller regular oscillations of the rotational speed n about the temporal course of a mean rotational speed $n_m$.

Between the time points $t_1$ and $t_2$ the rotational speed n continuously decreases before it then between the time points $t_2$ and $t_3$ is subject to greater fluctuations which in the shown temporal course can be recognized by way of clearly pronounced vibrations in the form of upwards and downwards swings. With increasing time these vibrations decrease again so that after the time point $t_3$ the rotational speed n only shows fluctuations that correspond in degree and number essentially to the fluctuations at the beginning of the shown course.

Such a temporal course of the rotational speed n can for example occur in vehicles with a so called start-stop automatic, when the vehicle for example approaches a red traffic light, is stopped by braking in which the driver disengages the gear and releases the clutch pedal. In this case the combustion engine would be automatically turned off by the start-stop automatic after a short time of about 1 second. However when the driver during this turning off process pushes down the clutch pedal, for example to drive on because the traffic light is meanwhile changed to green, the rotational speed, which has meanwhile dropped below the idle rotational speed, is increased again wherein until reaching or exceeding the idle rotational speed between the time points $t_2$ and $t_3$ strong rotational speed fluctuations can occur due to resonances. Similar courses can result when the rotational speed of the combustion engine is for example choked during the drive by braking or during standstill of the vehicle by a corresponding actuation of the clutch.

| List of reference signs | |
|---|---|
| 11 | Combustion engine |
| 11a | Driven shaft |
| 12 | Dual mass flywheel (ZMS) |
| 12a | Input side ZMS |
| 12b | Output side ZMS |
| 12c | Connection device ZMS |
| 12c1 | Damping element |
| 12c2 | Spring element |
| 13 | Electronic control device |
| 14 | Rotational speed measuring device |
| 15 | Transmission device |
| 16 | Speed measuring device |
| 17 | Wheel-tire combination |
| 18 | Drive train |
| 21 | Temporal course of the driven shaft rotational speed |
| 22 | Rotational speed threshold value |
| 23 | Recognition of the critical rotational speed situation |
| 24 | Tolerance values/tolerance range (amplitude) |
| 24a | Tolerance threshold value |
| 24b | Tolerance basis |
| 25 | Exceeding tolerance range |
| 26a, 26b | Local rotational speed characteristic value (mean value) |
| 27 | Global vibration pattern |
| 27a, 27b | local vibration pattern |
| 28a, 28b | Local amplitude |
| 29 | Vibration time period |
| 29a, 29b | Local vibration time period |
| 30a to 30d | Pattern of rotational speed fluctuations |

What is claimed is:

1. A method for recognizing a succession of rotational speed/torque fluctuations of a drive device having at least one combustion engine and a torsional vibration influencing device, said method comprising:
  measuring with a measuring value detection device an actual rotational speed of the rotational speed/torque fluctuations of the torsional vibration influencing device for recognizing rotational speed/torque fluctuations of the torsional vibration influencing device;
  detecting a local rotational speed minimum and a local rotational speed maximum of the torsional vibration influencing device,
  establishing with the control device local rotational speed characteristic values, said local rotational speed characteristic values including a local amplitude and a local frequency;

determining directly or indirectly a local vibration time period, during which at least one of the local amplitude and the local frequency, is constant, and describing a local vibration pattern, said local vibration pattern exhibiting at least the local amplitude, the local frequency or the local vibration time period.

2. The method of claim 1, wherein the drive device is a drive device of a motor vehicle and the torsional vibration influencing device is a dual mass flywheel.

3. The method of claim 1, wherein the local vibration patterns are recognized when a critical rotational speed situation is present, wherein for recognizing this situation the determined actual rotational speed is compared with a predeterminable rotational speed threshold value.

4. The method of claim 3, wherein a critical rotational speed situation is present when the determined actual rotational speed falls below the predeterminable rotational threshold value.

5. The Method according to claim 2, wherein the rotational speed threshold value is dependent on one of the local rotational speed characteristic values.

6. The method of claim 1, wherein when at least one of the local rotational speed characteristic values changes above a vibration tolerance range a further one of this local vibration patterns is determined.

7. The method of claim 1, wherein one of these local vibration patterns has at least one data selected from the group consisting of a local amplitude, a local frequency, a local vibration time period and a local equivalence rotational speed, wherein the local equivalence rotational speed represents a characteristic value for the rotational speed of the torsional vibration influencing device for the vibration time period.

8. The method of claim 7, wherein one of the local vibration patterns contains a number of the vibrations that have occurred in the local vibration time period.

9. The method of claim 1, wherein when exceeding a vibration time period threshold value or when exceeding a predetermined number of vibrations a global vibration pattern is formed from the local vibration patterns, by combining multiple of the local vibration patterns.

10. The method of claim 1, wherein a global vibration pattern or at least one local vibration pattern is compared with predetermined reference vibration patterns, wherein this comparison enables a categorization of the vibration pattern, with regard to the torsional vibration influencing device.

11. The method of claim 10, wherein the categorization is dependent on at least one, rotational speed or on one of the actual rotational speeds within the vibration time period.

12. The method of claim 10, further comprising generating a control command for the drive device as a function of an association of the vibration pattern with one of the reference vibration patterns, wherein the control command leads to a change of the rotational speed of the torsional vibration influencing device, by means of a change of the rotational speed of the combustion engine.

13. A device, for performing the method of claim 1, said device comprising at least one processing device, a memory device for storing data, and one or multiple measuring value detection devices for detecting measuring values, wherein the processing device is configured to analyze the local rotational speed values, for forming local rotational speed characteristic values, wherein the memory device is configured to store at least the local rotational speed values or at least the local vibration patterns or at least the global vibration patterns, and wherein at least one of these measuring value detection devices is configured to detect the rotational speed of the torsional vibration influencing device.

14. The method of claim 11, wherein a selection of the reference vibration patterns is dependent on the at least one local equivalence rotational speed or on the one of the actual rotational speeds within the vibration time period.

15. The method of claim 7, wherein the local equivalence rotational speed represents a characteristic value for the rotational speed of the torsional vibration influencing device for a mean value of the rotational speed for this time period.

* * * * *